US009135484B2

(12) United States Patent
Shearin et al.

(10) Patent No.: US 9,135,484 B2
(45) Date of Patent: Sep. 15, 2015

(54) DATA READER WITH LIGHT SOURCE ARRANGEMENT FOR IMPROVED ILLUMINATION

(75) Inventors: Alan Shearin, Eugene, OR (US); Paul R. Huss, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 884 days.

(21) Appl. No.: 13/232,760

(22) Filed: Sep. 14, 2011

(65) Prior Publication Data

US 2012/0074338 A1 Mar. 29, 2012

(51) Int. Cl.
G06K 7/14 (2006.01)
G06K 7/10 (2006.01)

(52) U.S. Cl.
CPC ........ G06K 7/10742 (2013.01); G06K 7/10831 (2013.01)

(58) Field of Classification Search
CPC .......... G06K 7/10881; G06K 7/10594; G06K 7/10693; G06K 7/10732; G06K 7/10722
USPC .......................... 250/566; 235/462.41–462.43
See application file for complete search history.

(56) References Cited

U.S. PATENT DOCUMENTS

| | | | |
|---|---|---|---|
| 5,255,171 A | 10/1993 | Clark | |
| 5,325,276 A | 6/1994 | Sullivan | |
| 5,449,892 A * | 9/1995 | Yamada | 235/462.42 |
| 5,710,418 A | 1/1998 | Tawara | |
| 5,723,868 A | 3/1998 | Hammond, Jr. et al. | |
| 5,756,981 A | 5/1998 | Roustaei et al. | |
| 6,351,594 B1 | 2/2002 | Nakamura et al. | |
| 6,641,284 B2 | 11/2003 | Stopa et al. | |
| 7,546,951 B2 | 6/2009 | Kotlarsky et al. | |
| 7,617,984 B2 | 11/2009 | Nunnink | |
| 7,634,104 B2 | 12/2009 | Alasia et al. | |
| 7,753,269 B2 | 7/2010 | Russell et al. | |
| 8,450,708 B2 * | 5/2013 | Liu et al. | 250/566 |
| 8,894,257 B2 | 11/2014 | Rice et al. | |
| 8,919,651 B2 | 12/2014 | Gao et al. | |

(Continued)

FOREIGN PATENT DOCUMENTS

| | | |
|---|---|---|
| CN | 1922516 | 2/2007 |
| CN | 101408927 | 4/2009 |

(Continued)

OTHER PUBLICATIONS

International Search Report, PCT/US2011/051633, Feb. 28, 2012.

(Continued)

*Primary Examiner* — Tony Ko
(74) *Attorney, Agent, or Firm* — Stoel Rives LLP

(57) ABSTRACT

Light sources are contained in a data reader housing that also contains an imager. In one embodiment, one light source includes a number of LEDs placed in a number of hollow reflectors located toward the rear of a data scanner, where the hollow reflectors have substantially flat reflective surfaces to project light through a window and into a read volume. Other embodiments include additional light sources located proximate sidewalls of the data scanner and also include a number of LEDs placed in hollow reflectors to project light through the window and into the read volume. In other embodiments, additional LEDs are included outside the hollow reflectors to project light through the window and into a different portion of the read volume than the LEDs located in the hollow reflectors.

24 Claims, 12 Drawing Sheets

(56) References Cited

U.S. PATENT DOCUMENTS

| | | |
|---|---|---|
| 2005/0185416 A1 | 8/2005 | Lee et al. |
| 2006/0022051 A1 | 2/2006 | Patel et al. |
| 2006/0054703 A1 | 3/2006 | Kahn et al. |
| 2006/0071075 A1 | 4/2006 | Moon et al. |
| 2006/0237636 A1 | 10/2006 | Lyons et al. |
| 2007/0090193 A1 | 4/2007 | Nunnink et al. |
| 2008/0142600 A1 | 6/2008 | Joseph et al. |
| 2008/0277473 A1 | 11/2008 | Kotlarsky et al. |
| 2008/0277474 A1 | 11/2008 | Kotlarsky et al. |
| 2008/0277475 A1 | 11/2008 | Kotlarsky et al. |
| 2008/0277476 A1 | 11/2008 | Kotlarsky et al. |
| 2008/0277478 A1 | 11/2008 | Kotlarsky et al. |
| 2008/0283606 A1 | 11/2008 | Kotlarsky et al. |
| 2008/0283607 A1 | 11/2008 | Kotlarsky et al. |
| 2008/0283608 A1 | 11/2008 | Kotlarsky et al. |
| 2008/0290172 A1 | 11/2008 | Kotlarsky et al. |
| 2008/0290173 A1 | 11/2008 | Kotlarsky et al. |
| 2008/0296384 A1 | 12/2008 | Kotlarsky et al. |
| 2008/0314985 A1 | 12/2008 | Kotlarsky et al. |
| 2008/0314986 A1 | 12/2008 | Kotlarsky et al. |
| 2008/0314987 A1 | 12/2008 | Kotlarsky et al. |
| 2009/0020610 A1 | 1/2009 | Kotlarsky et al. |
| 2009/0057410 A1 | 3/2009 | Kotlarsky et al. |
| 2010/0019043 A1 | 1/2010 | Sackett et al. |
| 2010/0078483 A1 | 4/2010 | Liu et al. |
| 2012/0018516 A1 | 1/2012 | Gao et al. |
| 2013/0327829 A1 | 12/2013 | Thompson et al. |

FOREIGN PATENT DOCUMENTS

| | | |
|---|---|---|
| JP | 2006221840 | 8/2006 |
| JP | 2009-015634 A | 1/2009 |
| WO | WO 2012/012651 | 1/2012 |

OTHER PUBLICATIONS

International Preliminary Report on Patentability concerning corresponding PCT/US2011/051633, Apr. 11, 2013.

Gao, U.S. Appl. No. 13/188,244, Data Reader Having Compact Arrangement, filed Jul. 21, 2011.

First Office Action and Search Report from Chinese Patent Application No. 201180046917X dated Feb. 28, 2015, 13 pages.

Supplementary Search Report and Office Action from European Patent Application No. 11831170.3 dated Jun. 19, 2015, 9 pages.

\* cited by examiner

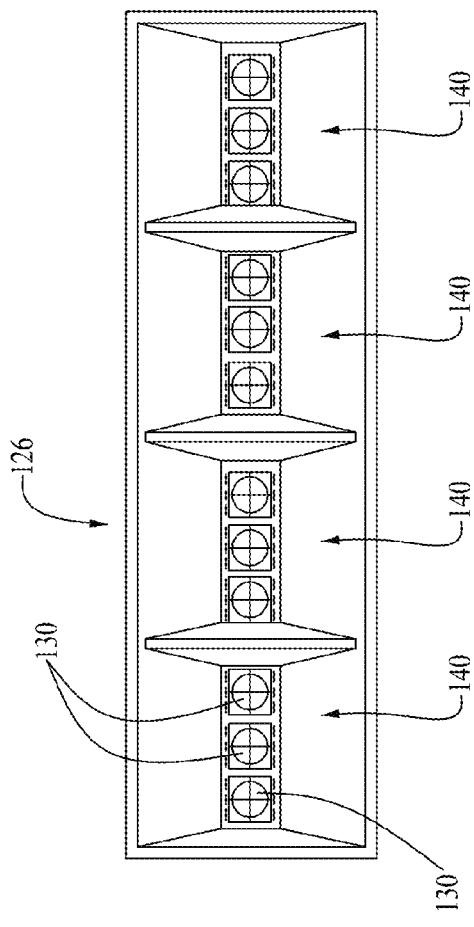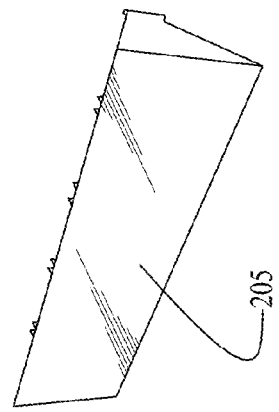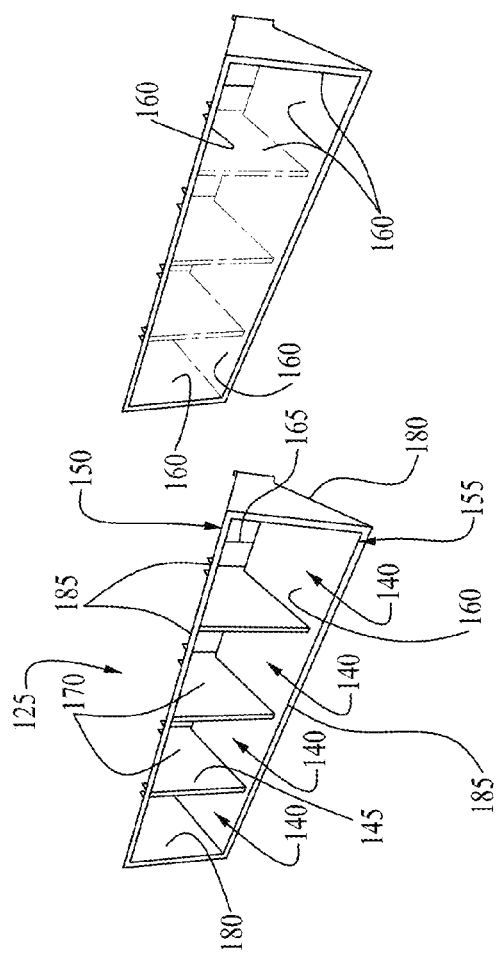

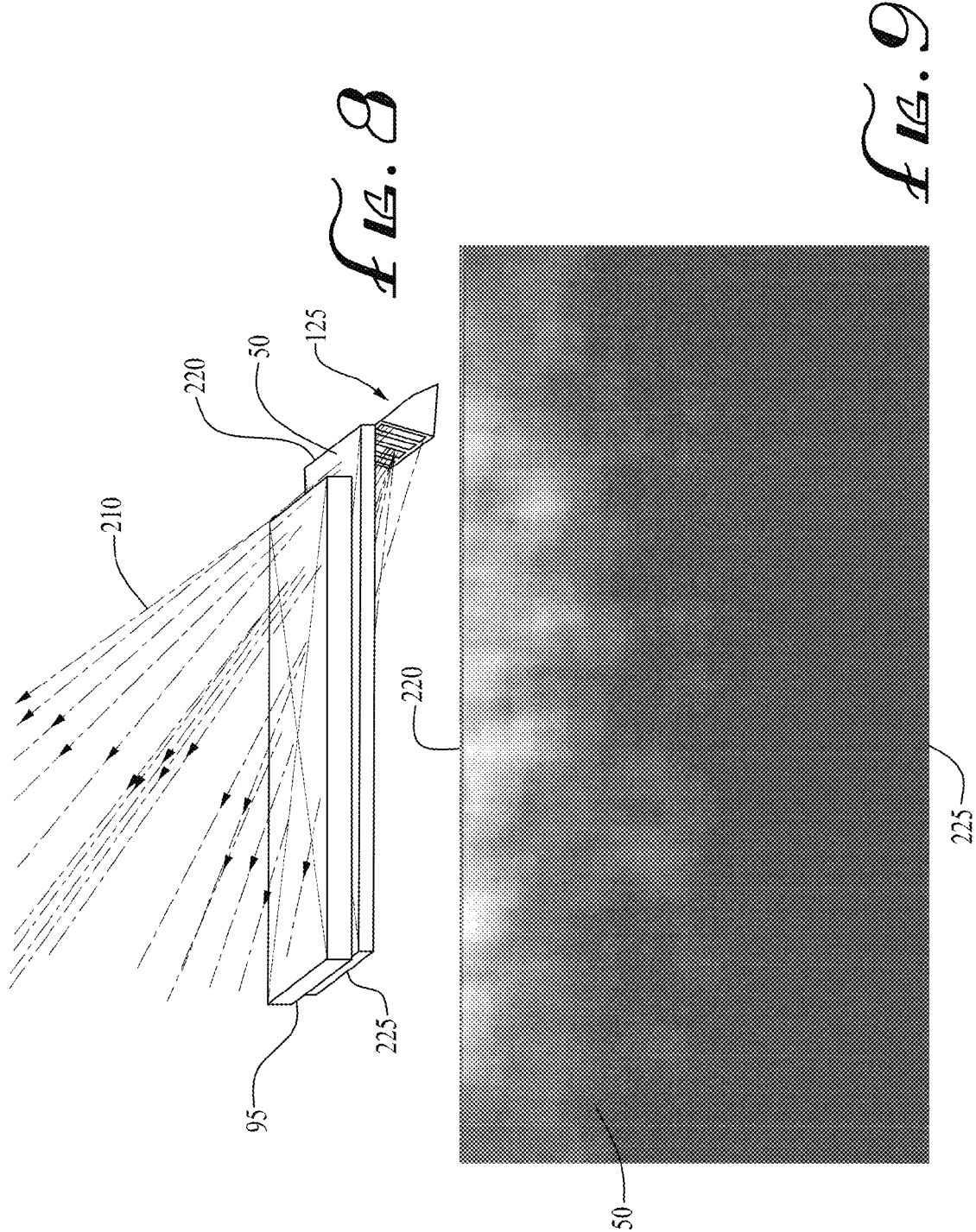

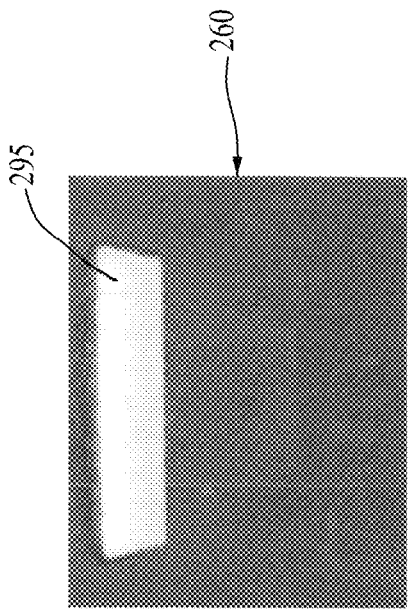
Fig. 15
Fig. 16
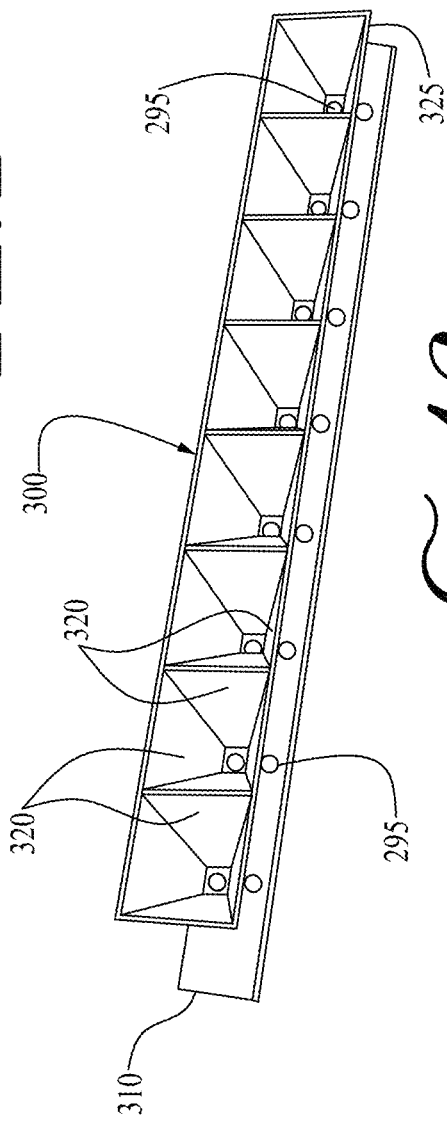
Fig. 18

DATA READER WITH LIGHT SOURCE ARRANGEMENT FOR IMPROVED ILLUMINATION

RELATED APPLICATION DATA

This application claims priority to U.S. Provisional Application No. 61/387,390 filed Sep. 28, 2010 and titled "Illumination Arrangement For Data Readers," which is fully incorporated herein by reference.

TECHNICAL FIELD

This disclosure relates generally to illumination devices and systems for data readers, and to such illumination devices and systems including light emitting diodes in particular.

BACKGROUND

The present inventors have recognized that typical in-counter and presentation-type data readers do not use solid state imaging devices, such as a charge-coupled device (CCD) imager or a complimentary metal-oxide-semiconductor (CMOS) imager to capture data. The present inventors have also recognized there are several challenges to including solid state imaging devices in in-counter and presentation-style data readers. One such challenge is locating a light source in the housing such that a read volume is adequately illuminated without reflecting light back onto the solid state imager. Another such challenge recognized by the present inventors is providing a light source including light emitting diodes (LEDs) that does not create harsh point source lighting effects, such as shining brightly in a user's eyes. Another such challenge is providing a light source including LEDs that lights a read volume relatively evenly and without creating specular reflection off an object in the read volume.

One device for using LEDs as a light source for a bar code reader includes a number of conical reflectors with an LED at the base of each cone as disclosed in U.S. Pat. No. 5,723,868. While rotationally symmetric reflectors, such as cylindrical reflective cones, are efficient at reflecting light emitted from each LED, the present inventors have recognized that such rotationally symmetric reflectors produce a circular appearance of light and do not blend the light from each LED together, thus creating brighter and darker areas in the illuminated area and an unpleasing appearance.

Accordingly, the present inventors recognized there is a need for an in-counter, presentation-style, or other suitable style, data reader with a solid state imager and a lighting system with lighting devices that provide adequate illumination for the solid state imager to capture high-quality images of objects in a read volume. The present inventors also recognized there is a need for a lighting system with improved lighting devices that (a) do not reflect light onto the solid state imager, (b) do not create harsh point source lighting effects, (c) lights a read volume relatively evenly, (d) does not create specular reflection off an object in the read volume, and (e) blends the light from multiple LEDs together to create illumination without substantially brighter and darker areas, singularly, or in any combination.

SUMMARY

Light sources are contained in a data reader housing that also contains an imager. In one embodiment, one light source includes a number of LEDs placed in a number of hollow reflectors located toward the rear of a data scanner, where the hollow reflectors have substantially flat reflective surfaces to project light through a window and into a read volume. Other embodiments include additional light sources located proximate sidewalls of the data scanner and also include a number of LEDs placed in hollow reflectors to project light through the window and into the read volume. In other embodiments, additional LEDs are included outside the hollow reflectors to project light through the window and into a different portion of the read volume than the LEDs located in the hollow reflectors.

This disclosure describes embodiments for an improved data reader with an imager and light sources contained within a housing suitable for in-counter installation. This disclosure also described embodiments for an improved data reader with an imager and light sources contained within a housing suitable as a presentation-type use. In light of the above problems recognized by the present inventors, embodiments described herein include illumination devices and systems that address one or more of (a) not reflecting light onto the solid state imager, (b) not creating harsh point source lighting effects, (c) lighting a read volume relatively evenly, (d) not creating specular reflection off an object in the read volume, and (e) blending light from multiple LEDs together to create illumination without substantially brighter and darker areas.

Additional aspects and advantages will be apparent from the following detailed description of preferred embodiments, which proceeds with reference to the accompanying drawings.

BRIEF DESCRIPTION OF THE DRAWINGS

FIG. 1 illustrates a top front orthogonal view of an embodiment of an in-counter data reader with light generators on.

FIG. 2 illustrates a top left orthogonal view of the embodiment of FIG. 1 with light generators on.

FIG. 4 illustrates top rear orthogonal view of the embodiment of FIG. 1 with light generators on.

FIG. 6 illustrates a front plan view of an embodiment of a light source.

FIG. 7A illustrates a top right orthogonal view of another embodiment of a light source with light generators off.

FIG. 7B illustrates a top right orthogonal view of the embodiment of FIG. 7A with light generators on, but without a diffuser.

FIG. 7C illustrates a top right orthogonal view of the embodiment of FIG. 7A with light generators on, and with a diffuser.

FIG. 8 illustrates a hypothetical light ray distribution for a light source projecting light through a window and into a projected read volume.

FIG. 9 illustrates a hypothetical light distribution over the window of FIG. 8.

FIG. 14A illustrates a top left-side orthogonal view of an embodiment of a light source with illumination generators off.

FIG. 14B illustrates a front orthogonal view of the embodiment of FIG. 14A with illumination generators on, but without a diffuser.

FIG. 14C illustrates a front orthogonal view of the embodiment of FIG. 14A with illumination generators on.

FIG. 14D illustrates a front orthogonal view of the embodiment of FIG. 14A with illumination generators on, and with a diffuser.

FIG. 15 illustrates a hypothetical light distribution across a diffuser for an embodiment of a light source.

FIG. 16 illustrates a front orthogonal view of an embodiment of a presentation-style data reader.

FIG. 18 illustrates a front bottom orthogonal view of an embodiment of a light source.

FIG. 19 illustrates a hypothetical light distribution in a near field of the read volume of FIG. 18 with light generators inside and outside hollow reflectors on.

FIG. 20 illustrates a hypothetical light distribution in a far field of the read volume of FIG. 18 with light generators inside and outside hollow reflectors on.

DETAILED DESCRIPTION OF PREFERRED EMBODIMENTS

Figure 1:
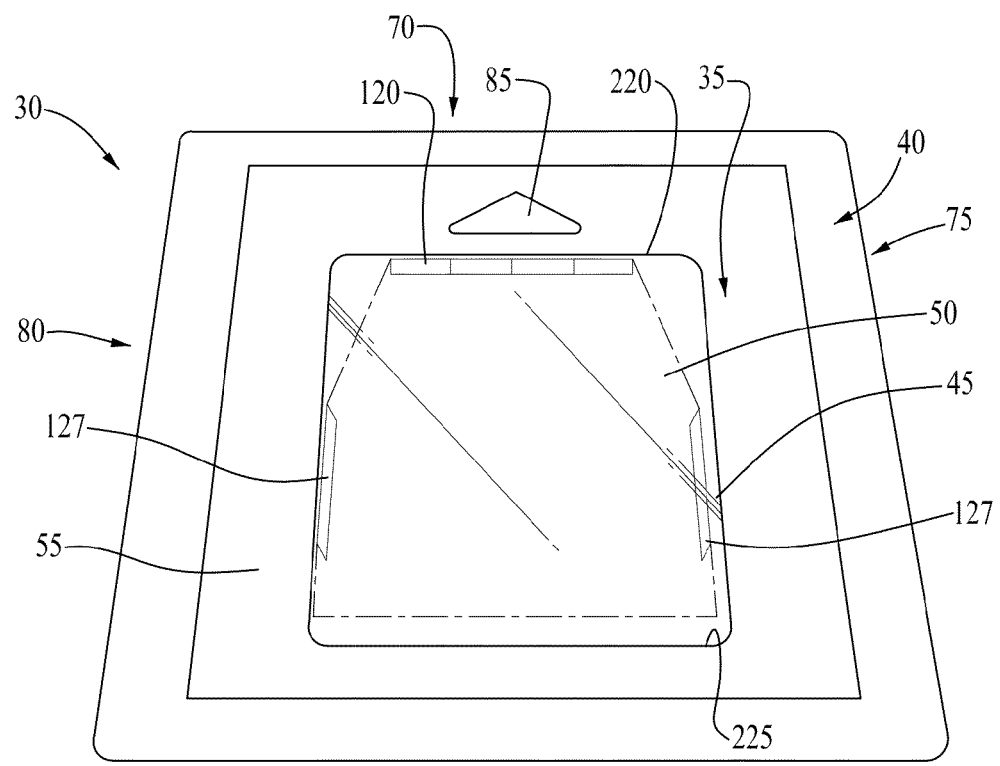

While the following discussion references preferred embodiments having specific housing structures and light sources, the invention is not limited to the particular details discussed. The described features, structures, characteristics, and methods may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or operations are not shown or not described in detail to avoid obscuring aspects of the embodiments. For convenience, the methods and systems may be described herein with reference to in-counter or presentation data readers having solid state imagers and light emitting diode light generators, however, it is understood that the methods described herein are applicable to any data reader and to any type of light generator.

Preferred embodiments of a data reader 30 configured for in-counter mounting are illustrated FIGS. 1-13. In the exemplary embodiment illustrated in FIGS. 1-4, data reader 30 includes a weighing platform 35 as part of housing 40, however the weighing platform and associated weight determining equipment are optional. Data reader 30 is configured for mounting in a counter or other suitable, relatively flat surface. In-counter, single plane horizontal data readers, such as data reader 30, typically have a leading edge that an operator draws an item across and over the window to read the item. The in-counter data reader preferably includes illumination distributed evenly on the window as well as projected onto the leading edge of the item to be read. However, it is also preferred that such an imager-based in-counter data reader is located where an operator can see through the window into the interior of the data reader. Preferably, to make the light sources unobtrusive during normal use, the visible surfaces of the light sources are oriented such that the visible surfaces are perpendicular, or at an angle, with respect to the flat surface of the window such that the visible surfaces are not parallel with the flat surface of the window.

Data reader 30 includes a housing 40 that includes a top surface 45 bearing a window 50. Window 50 is surrounded and held in place by a frame, or bezel 55, which may be integral with top surface 45 (as illustrated) or may be a separate component attached to the top surface 45. In other embodiments, window 50 may be surrounded by a lip or other edging. In other embodiments, the window 50 may constitute all, or the majority, of top surface 45. The housing 40 includes a bottom surface 60 (FIG. 5, viewable through window 50) and a front wall 65, a rear wall 70, a first sidewall 75, and a second sidewall 80 (FIG. 10 and positions indicated by arrows in FIG. 1) extending between the top surface 45 and the bottom surface 60. The front wall 65, the rear wall 70, the first sidewall 75, and the second sidewall 80 may be connected to one another, or spaces may be left between any or all of them. Objects with data, indicia, or other suitable information to be read are preferably moved across, or over, top surface 45 in a direction from the front wall 65 toward the rear wall 70, that is, in the direction indicated by arrow 85.

Figure 5:
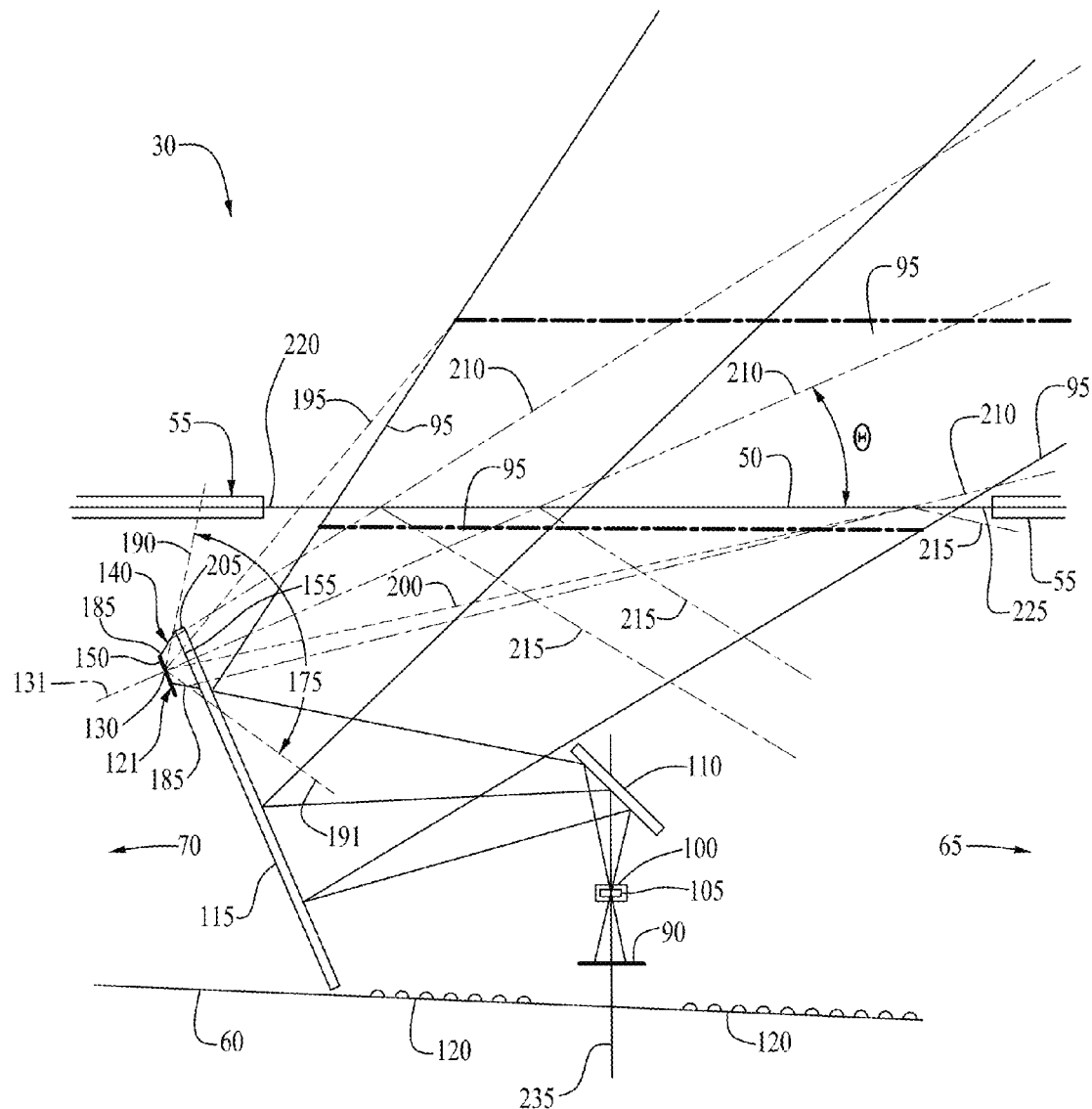
FIG. 5 illustrates a cross-sectional view of another embodiment of an in-counter data reader.

An imager 90 is located in housing 40. Imager 90 is a solid-state imager, such as a charge-coupled device (CCD) imager, complimentary metal-oxide-semiconductor (CMOS) imager, or may be any other suitable imager. The imager 90 is preferably located proximate the bottom surface 60 and is centrally located, that is, approximately equidistant from both the front wall 65 and rear wall 70 as well as approximately equidistant from both the first sidewall 75 and second sidewall 80. Preferably, the imager 90 is mounted on a PCB. In other embodiments, the imager 90 may be offset, that is, imager 90 may be closer to either front wall 65 or rear wall 70, or closer to either first sidewall 75 or second sidewall 80, singularly or in combination. Operationally, the imager 90 utilizes a projected three-dimensional read volume 95 (a cross-section of which is illustrated in FIG. 5).

When an object enters projected read volume 95, the imager 90 is able to make a high-quality image of such an object, that is, an image containing information that can be decoded, for example, a relatively clear or relatively noise-free or a relatively high signal to noise ratio image. The location, or placement, of projected read volume 95 may be altered, or projected, using one or more lenses, reflecting surfaces, prisms, or other suitable optical devices. For example, in data reader 30, the imager 90 includes an intrinsic read volume 100, that is a read volume that exists without aid from optical devices or surfaces, i.e., intrinsic to imager 90 itself, located in the vicinity of lens 105. However, lens 105, first reflecting surface 110, and second reflecting surface 115 project intrinsic read volume 100 to become projected read volume 95. That is, a high-quality image of an object located in projected read volume 95 can be made just as if the object were located in intrinsic read volume 100.

One advantage of creating a projected read volume 95 is controlling the size or volumetric dimensions of projected read volume 95. For example, projected read volume 95 is typically larger than intrinsic read volume 100. Another advantage is controlling the location of projected read volume 95. For example, projected read volume 95 is preferably projected such that a portion of projected read volume 95 overlaps, intersects, touches, or lies adjacent window 50.

Projected read volume 95 may also be located toward one side of window 50, such as the side of window 50 facing away from imager 90.

For a data reader 30 including a solid-state imager 90, a light source is preferably included to illuminate objects in projected read volume 95. One optional location for a light source, such as light source 120 including one or more light generators such as light emitting diodes (LEDs), halogen bulbs, or other suitable light generators (FIG. 5), is on or proximate bottom surface 60 of the housing 40. Such a location configures light source 120 to project light substantially orthogonally through window 50. While light source 120 projecting light substantially orthogonally through window 50 adequately illuminates an object located in projected read volume 95, such a light source 120 will likely shine brightly in a user's eyes and may otherwise be unpleasant to work with. Thus, light source 120 is optional, although light source 120 may be used on its own.

A preferred location for a light source, such as light source 121, is proximate rear wall 70 such that light source 121 is closer to top surface 45 than bottom surface 60. Light source 121 is preferably located underneath, or is blocked from direct view, by bezel 55, or other suitable structure such as a frame, lip, or edge surrounding, or partially surrounding, window 55. Alternately, the light source 121 may be located closer to bottom surface 60 than to top surface 45. Preferably, light source 121 projects light through window 50 at an angle θ substantially less than 90°. For example, light from light source 121 may encounter window 50 at an angle θ of 80°, 75°, 70°, 65°, 60°, 55°, 50°, 45°, 40°, 35°, 25°, any angle in between, or other suitable angle that provides adequate illumination to projected read volume 95. In one embodiment, adequate illumination includes an illuminance of approximately 200 lux (time averaged value for pulsed illumination) to approximately 600 lux (time averaged value for pulsed illumination) for light of a wavelength of approximately 400 nanometers (nm) to approximately 700 nm on the surface of an object in projected read volume 95. The angle at which light from light source 121 encounters window 50 may be adjusted depending on the material composition, surface roughness, or other suitable property of window 50, the wavelength, lumens, or other suitable property of the light, or a combination of such properties.

The light source 121 includes a plurality of light generators 130. Light generators 130 are LEDs, preferably emitting wavelengths that are best detected by imager 90. For example, imager 90 may include a 1.3 megapixel model number EV76C560 imager made by e2v Ltd. of Chelmsford, United Kingdom, and light generators 130 emit a red wavelength of approximately 620 nm to approximately 640 nm. Other suitable light generators 130 may be used, such as other LEDs, incandescent lamps, including halogen lamps, and gas-discharge lamps, including fluorescent lamps. Light generators 130 are preferably arranged in a line, or may be staggered, or otherwise suitably arranged on a substrate, such as a printed circuit board (PCB) 136 (FIG. 13), when light generators 130 include LEDs. Light generators 130 include an illumination axis 131. Illumination axis 131 represents a central portion of the light emitted by a light source, such as light source 120. That is, the central illumination axis 131 represents the major direction along which a majority of the light emitted from light generators 130 in a light source 120 travels. In one embodiment, the central illumination axes 131 of each light generator 130/hollow reflector 140 combination are parallel, or substantially parallel, with each other. However, central illumination axes 131 may be arranged in any suitable manner, including non-parallel, intersecting, or otherwise.

Figure 13:
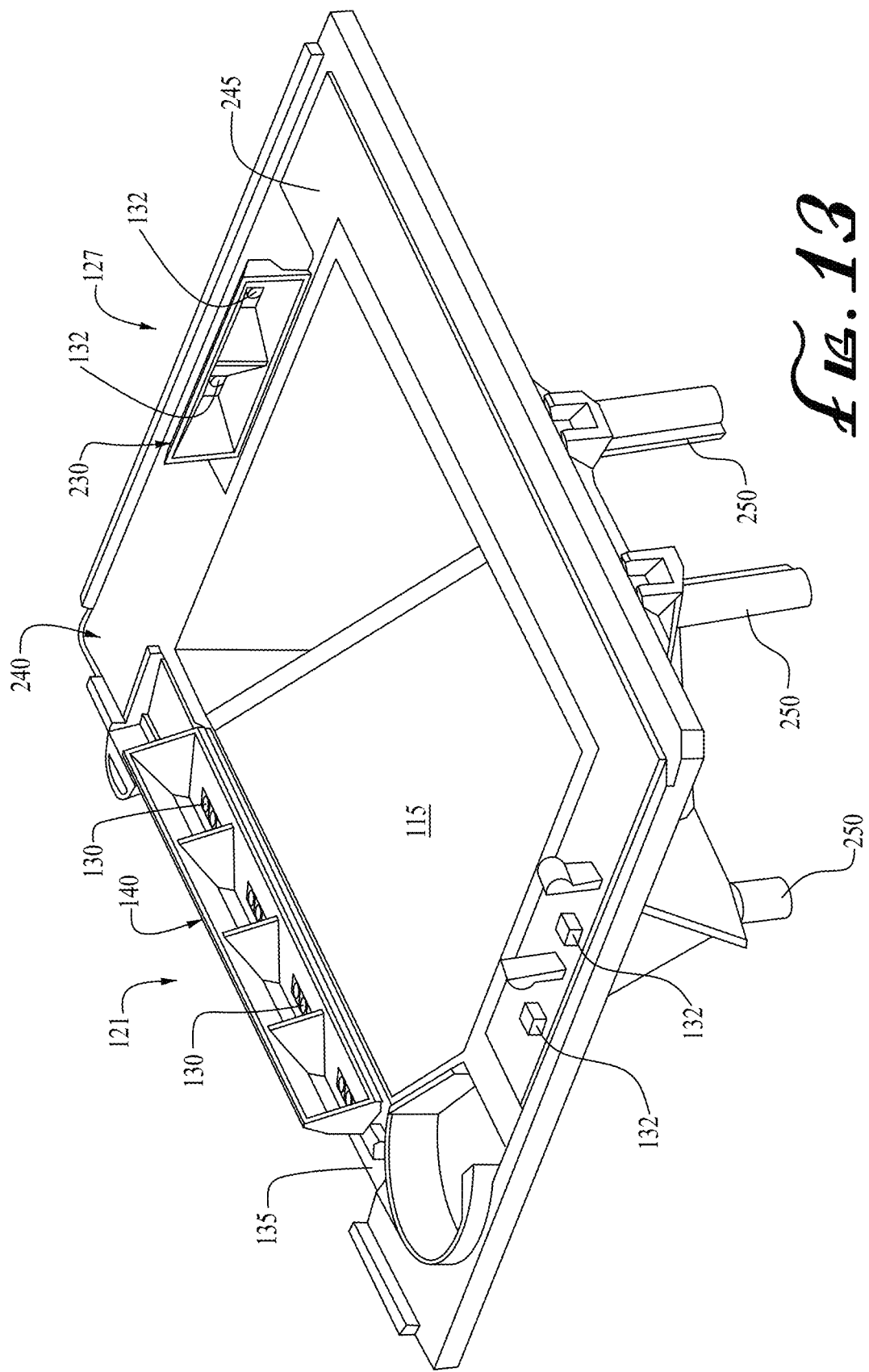
FIG. 13 illustrates a top left-side orthogonal view of an arrangement of light sources for an embodiment.

Light generators 130 are contained within hollow reflectors 140. Hollow reflectors 140 are mounted on substrate 135, either by direct or indirect attachment to substrate 135 (FIG. 13). FIG. 6 illustrates a light source 126 with three light generators 130 located in each of the hollow reflectors 140. However, any suitable number of one or more light generators 130 may be located in each of the hollow reflectors 140 in other embodiments.

FIG. 7A illustrates a light source 125 with four hollow reflectors 140 and with light generators off. Each hollow reflector 140 is preferably a truncated pyramid-shaped reflector, and hollow reflectors 140 are juxtaposed, or share a common wall. Alternately, the hollow reflectors 140 may be spaced apart, or a shared wall 145 may not extend fully from a truncated end 150 to a base end 155. Hollow reflectors 140 are preferably each a rectangular, truncated pyramid-shape, that is, both the smaller opening 165 and the larger opening 170 ( see FIG. 7A) are in the shape of a rectangle (which includes squares). Other embodiments may use other suitable truncated pyramid-shapes, such as triangular, pentagon, hexagon, etc. Truncated pyramid-shaped hollow reflectors 140 preferably include flat, or substantially flat, sides and are thus simple to prototype and manufacture.

Internal surfaces 160 are made from reflective materials, or include reflective materials or coatings thereon. For example, hollow reflectors 140 are made from injection molded plastic that is (a) reflective, (b) covered with a deposited coating (similar to a flashlight reflector, e.g., silver, aluminum, etc.), or (c) covered with a reflective membrane, such as Vikuti™ Enhanced Specular Reflector manufactured by 3M of St. Paul, Minn., or aluminized Mylar®. Other suitable materials may be used to make hollow reflectors 140, for example, Miro® reflective surfaces manufactured by Alanod of Ennepetal, Germany, or metals that can be polished to an appropriate level of reflectivity. In other embodiments, hollow reflectors, such as reflectors 140, may include a Lambertian or substantially Lambertian reflective surface, in other words, a surface that reflects light isotropically or substantially isotropically.

Different types of light generators 130 emit light in different directional patterns. For example, incandescent lamps and gas-discharge lamps commonly emit light omnidirectionally, with the exception of areas blocked from emitting light such as socket portions of the lamps. Many LEDs emit light in a spatial distribution, for example, a spatial distribution 175 of 120° (FIG. 5). Lenses or other optic devices may be included with an LED to change the spatial distribution, for example, by narrowing the spatial distribution to a viewing angle of 60° or 30°.

Different physical configurations and sizes of data readers, such as data reader 30, may require different spatial distributions of light to facilitate adequately illuminating an object in the projected read volume 95. One option is to match different types of light generators 130 to the physical configuration and size of the data reader. However, a preferred option is to select a particular light generator 130, such as an LED with a spatial distribution of approximately 120°, and use that particular light generator 130 for various data readers. The spatial distribution of a single type of LED can be tailored to match data reader requirements and maintain good lighting efficiency by using reflective surfaces. Modifying the physical shape and size of hollow reflectors 140 therefore facilitates using the same light generator 130 for different data readers by focusing, or projecting, light emitted from the light generators 130 to a desired location, such as within projected read volume 95.

A single LED part number may be used across multiple products while providing a customized light source for each product, thus simplifying component selection and electronic design.

For example, hollow reflectors 140 in data reader 30 are shaped and sized such that shared walls 145, end walls 180, and sidewalls 185 intercept, redirect, or reflect, portions of light within spatial distribution 175. FIG. 5 illustrates a cross-sectional view of a hypothetical example of how top and bottom sidewalls 185 redirect portions of light within spatial distribution 175 into the projected read volume 95 that would otherwise not enter the projected read volume 95. Without hollow reflectors 140, light generators 130 emit light having a spatial distribution 175 where light emitted between an outer boundary 190 of spatial distribution 175 and edge line 195, that is, a line drawn from light generator 130 to an edge of the projected read volume 95, would not enter projected read volume 95. Likewise, light emitted between an opposing outer boundary 191 of spatial distribution 175 and edge line 200 would not enter projected read volume 95.

However, light emitted from light generators 130 that reaches projected read volume 95 is increased by placing light generators 130 in hollow reflectors 140. Hollow reflectors 140 include sidewalls 185 (and end walls 180 and shared walls 145) that are angled between the smaller opening 165 and the larger opening 170 (see FIG. 7A) to intercept and redirect portions of the light contained in spatial distribution 175. By reflecting light emitted between outer bound 190 and edge line 195 and light emitted between outer boundary 191 and edge line 200 toward the projected read volume 95, the amount of light generated by light generators 130 that reaches projected read volume 95 increases. The geometry and size of hollow reflectors 140 may be adjusted to redirect light as needed for different configurations and sizes of data readers, or for different projected locations of projected read volume 95. In other words, hollow reflectors 140 are engineered to match the illumination to the projected read volume 95. While the preceding discussion focuses on the 2-dimensional view illustrated in FIG. 5, light emitted from light generators 130 forms a cone containing the majority of emitted light when LEDs are used. Therefore, the size and angles of sidewalls 185, end walls 180, and shared walls 145 are designed and arranged to reflect light to increase illumination in projected read volume 95.

Figure 14:
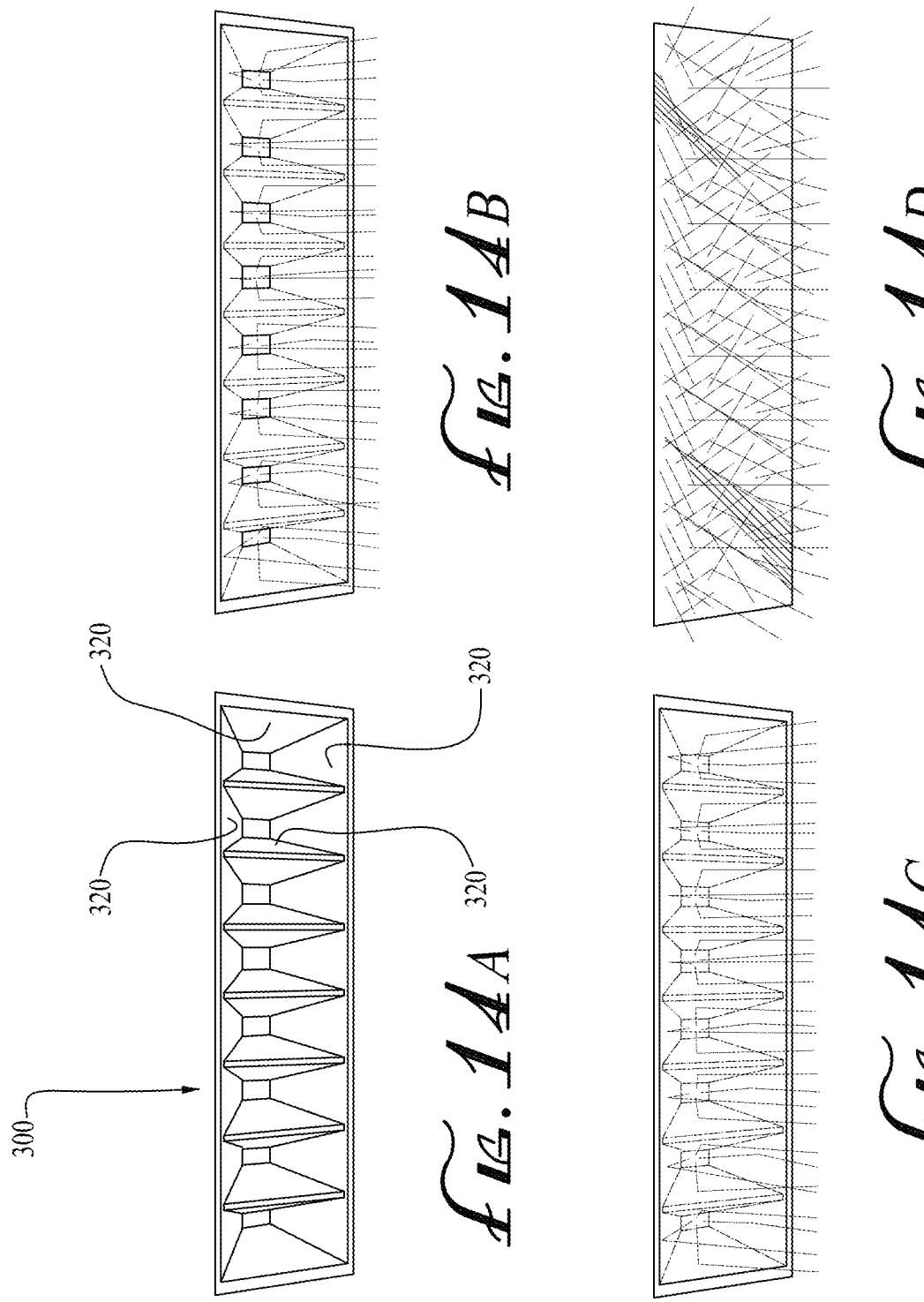

Light emitted from LEDs tends to be concentrated in a relatively narrow spatial distribution, such as spatial distribution 175, and appears to viewers as concentrated point sources of light. To diminish the harsh effects of such point source lights, an optional diffuser 205 is located over the larger openings 170 of the hollow reflectors 140. Diffuser 205 is preferably a single piece of diffuser material, but may be made from separate pieces of diffuser materials. A flat surface of diffuser 205 is preferably perpendicular to a flat surface of window 50, but may be off-set at an angle. Any suitable diffusing material, including but not limited to, Roscoe 117 (available from Roscolab, Ltd., London, England), Lee Filter 252 eighth white diffusion (available from Lee Filters, Ltd., Andover, England), Fusion Optic ADF6060 (available from Fusion Optix, Inc., Woburn, Mass.), or Luminit LSD Film (available from Luminit, LLC, Torrance, Calif.), may be used. Placing diffuser 205 over hollow reflectors 140 (a) reduces specular highlights, (b) diminishes the harsh appearance of point sources of light, or (c) provides a final appearance of a bar of light to a viewer (for example, as illustrated in FIGS. 7C, 14C, and 15), singularly or in any combination. A bar of light appearance is generally rectangular-shaped and may include a uniform light distribution over the surface, or may include a differential light distribution such as illustrated in FIG. 15. A bar of light appearance may include regions of higher intensity light, but preferably such high intensity regions do not appear to a viewer to be individual points of light. Adding a diffuser surface over the face of hollow reflectors 140 preferably makes bright point sources visually appealing, for example, by reducing specular highlights. Flat-sided hollow reflectors 140 preferably have a compact arrangement and a final appearance, when a diffuser 205 is added, as a bar of light. For example, when two LEDs are used as light generators 130 and diffuser 205 has a relatively large surface, the lighting from light sources 121 is "soft" and not difficult to view. In some embodiments, a diffuser, such as diffuser 205, may not be included.

Rotationally symmetric geometries for hollow reflectors 140, i.e., round or circular cones, efficiently redirect light, but do not blend light from LEDs together to form a final appearance of a bar of light to a viewer, even with a diffuser 205 in place. Therefore, round or circular cones are not preferred geometries for hollow reflectors 140.

Other embodiments may use lenses in place of hollow reflectors 140 to redirect light from light generators 130. For example, rotationally symmetric refractive components (lenses) could be molded or otherwise shaped to produce an output resembling a bar of light without harsh specular highlights. However, lenses may be more complex to prototype and manufacture than hollow reflectors 140, which have simple, flat sides and are relatively easily modeled and prototyped. Or, lenses may require a larger space or area in a data reader.

One consideration for where to place light generators 130 and imager 90 into data reader 30 is that light 210 striking window 50 at an angle substantially less than 90° will have a relatively significant reflected portion 215 that is reflected back into data reader 30 instead of transmitting through window 50. It is desirable to locate imager 90 at a location where reflected portion 215 of light 210 does not impinge upon imager 90, which would reduce the high-quality of images imager 90 makes of an object in the projected read volume 95. As illustrated in FIG. 5, reflected portion 215 is directed away from imager 90 and toward front wall 65. Front wall 65 may include light absorbing materials or structure, such as a light absorbing coating or paint, baffles, a light trap, or other suitable material or structure, to reduce the amount of light from reflected portion 215 that is internally reflected within data reader 30.

FIG. 8 is a hypothetical illustration of light 210 emitted by light generators 130 toward projected read volume 95. FIG. 9 is a hypothetical distribution of light from light generators 130 across window 50, where more light is present proximate rear edge 220 of window 50 than proximate front edge 225 of window 50. FIGS. 8 and 9 illustrate that light emitted from light generators 130 provides adequate light proximate rear edge 220 of window 50 and near the middle of window 50, but may not provide adequate light proximate front edge 225 of window 50. Thus, light emitted from light generators 130 provide adequate light for portions of projected read volume 95, but may not provide adequate light for other portions of projected read volume 95.

Figure 10:
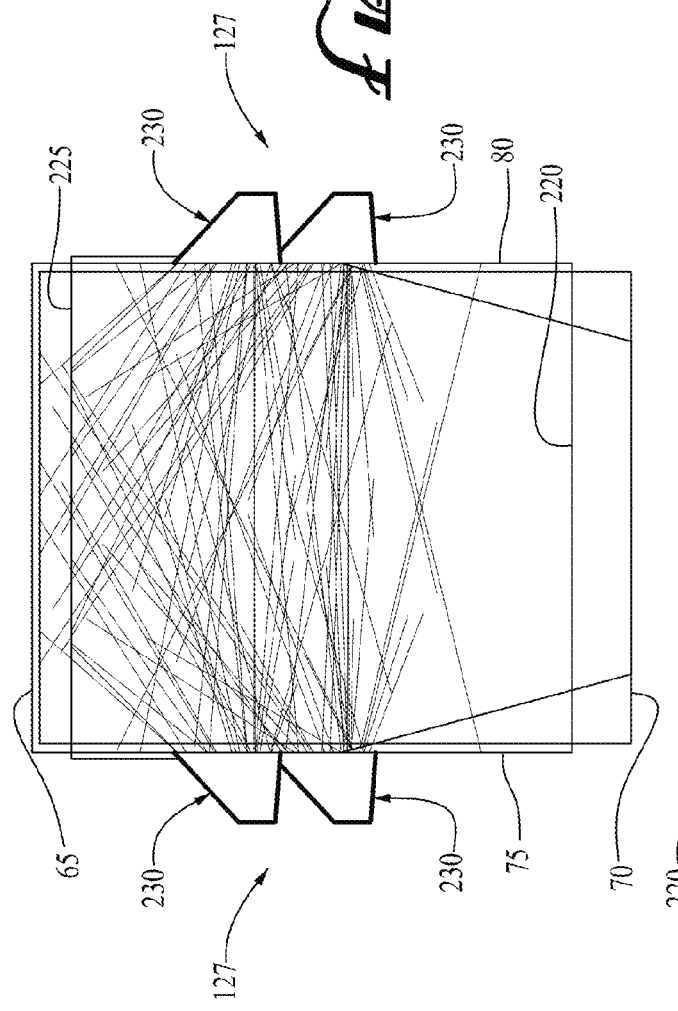
FIG. 10 illustrates a hypothetical light ray distribution for two light sources projecting light through a window.
Figure 11:
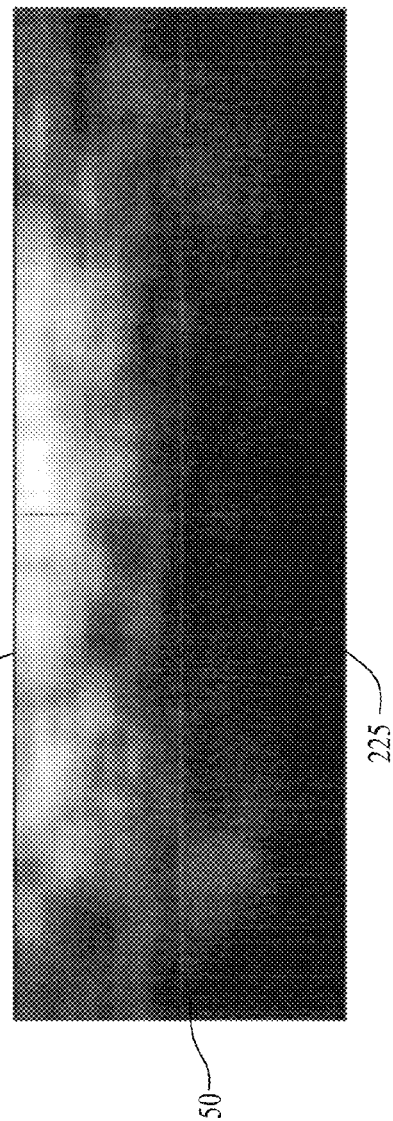
FIG. 11 illustrates a hypothetical light distribution over a window resulting from the light sources of FIGS. 8 and 10.

Adding additional light sources 127 (FIG. 10) including light generators 132 proximate first sidewall 75 and second sidewall 80 facilitates illuminating under-illuminated portions of window 50 and projected read volume 95. Light generators 132 located next to first sidewall 75 and second sidewall 80 are preferably closer to the front wall 65 than to the rear wall 70. Light generators 132 are located in hollow reflectors 230, which direct, reflect, or project light emitted from light generators 132 toward the front edge 225 of window 50, and thus into under-illuminated portions of the projected read volume 95. A hypothetical light distribution for light generators 132 in hollow reflectors 230 is illustrated in FIG. 10. FIG. 11 illustrates a hypothetical example of how light generators 130 in hollow reflectors 140 and light generators 132 in hollow reflectors 230 adequately illuminate the rear edge 220 of window 50, the front edge 225 of window 50 and the middle portion of window 50.

Figure 12:
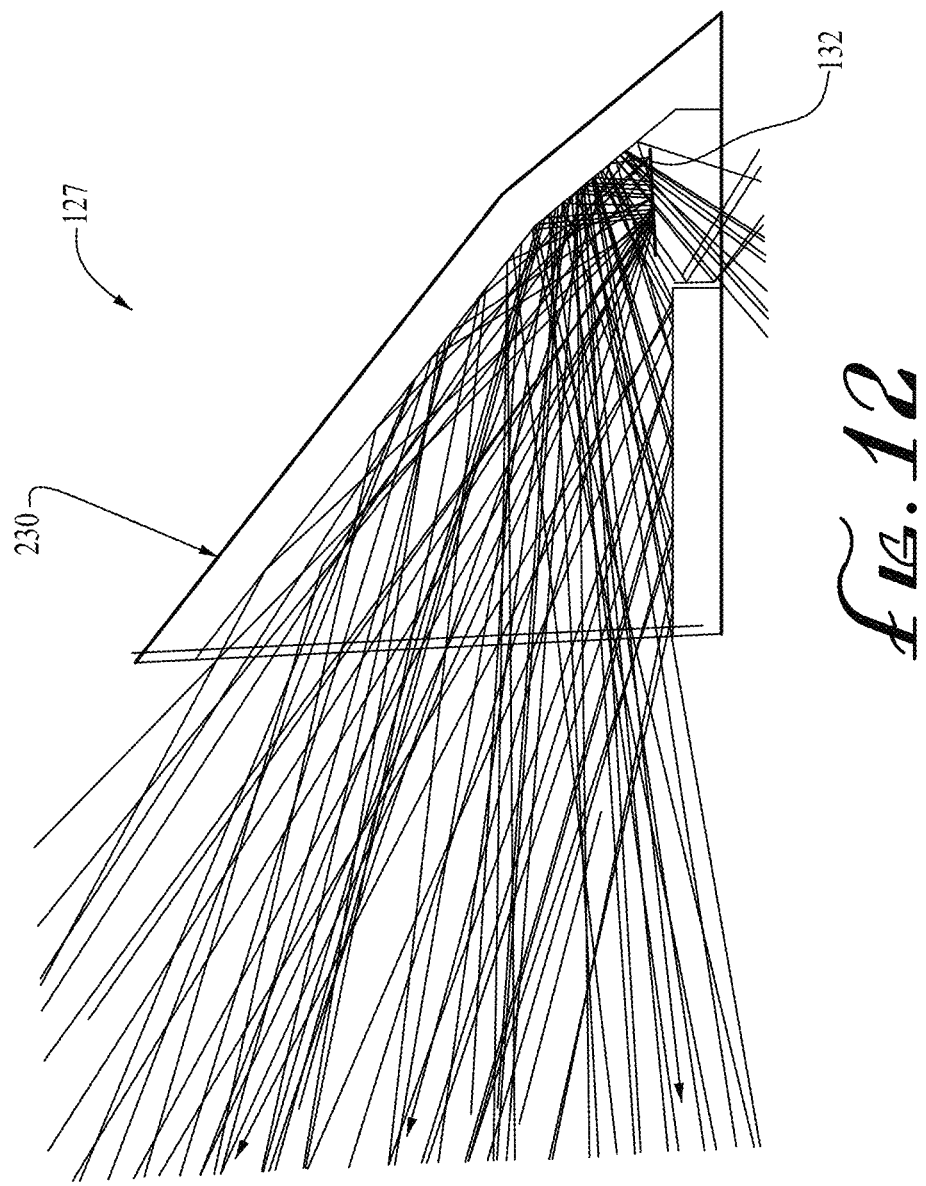
FIG. 12 illustrates a cross sectional view of a light source embodiment.

Hollow reflectors 230 may be constructed similar to how hollow reflectors 140 are constructed. In a preferred embodiment of data reader 30, hollow reflectors 140 are symmetric, whereas hollow reflectors 230 are asymmetric (as illustrated in FIGS. 10 and 12). Making hollow reflectors 230 asymmetric facilitates directing relatively large amounts of light emitted by light generators 132 toward the front edge 225 of window 50. Hollow reflectors 230 preferably include flat, or substantially flat, reflective surfaces and a diffuser to (a) reduce specular highlights, (b) diminish the harsh appearance of point sources of light, or (c) provide a final appearance of a bar of light to a viewer, singularly or in any combination, especially when LEDs are used as light generators 132.

Figure 2:
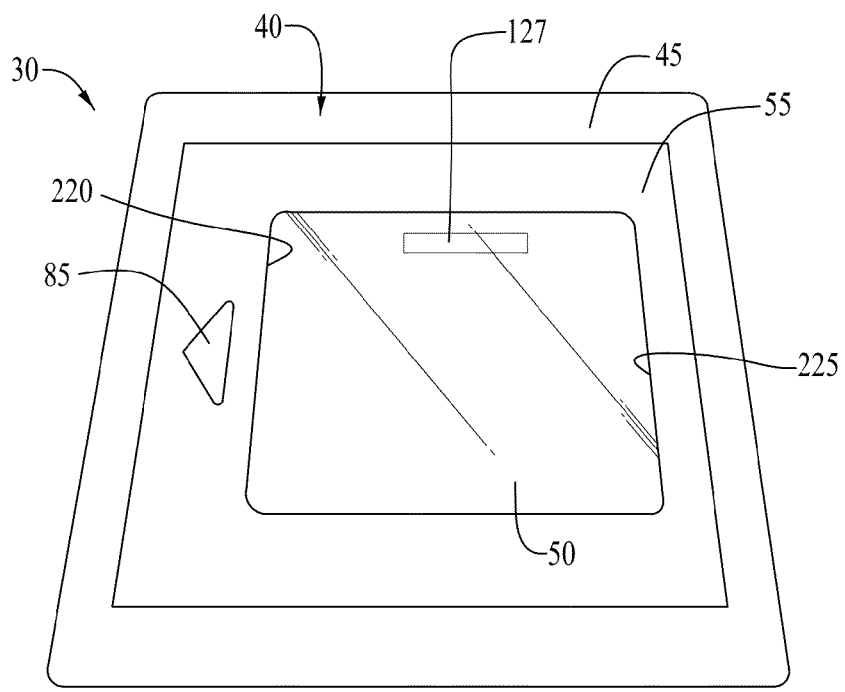
Figure 3:
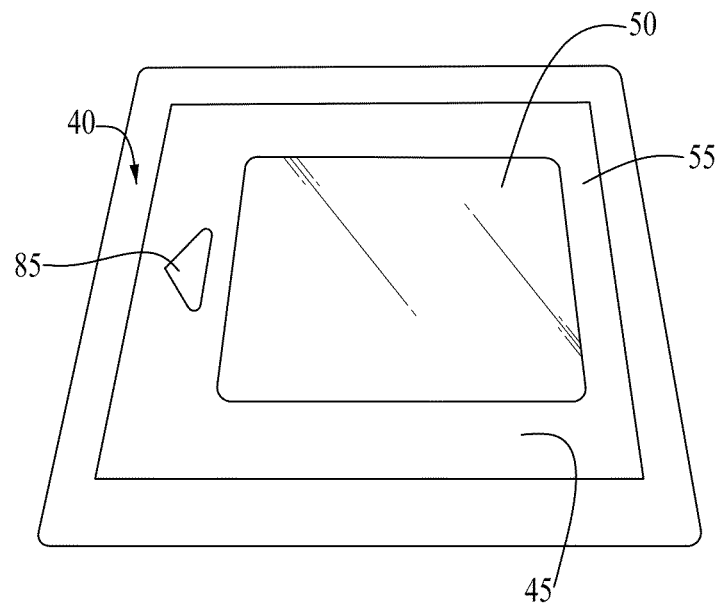
FIG. 3 illustrates a top left orthogonal view of the embodiment of FIG. 1 with light generators off.
Figure 4:
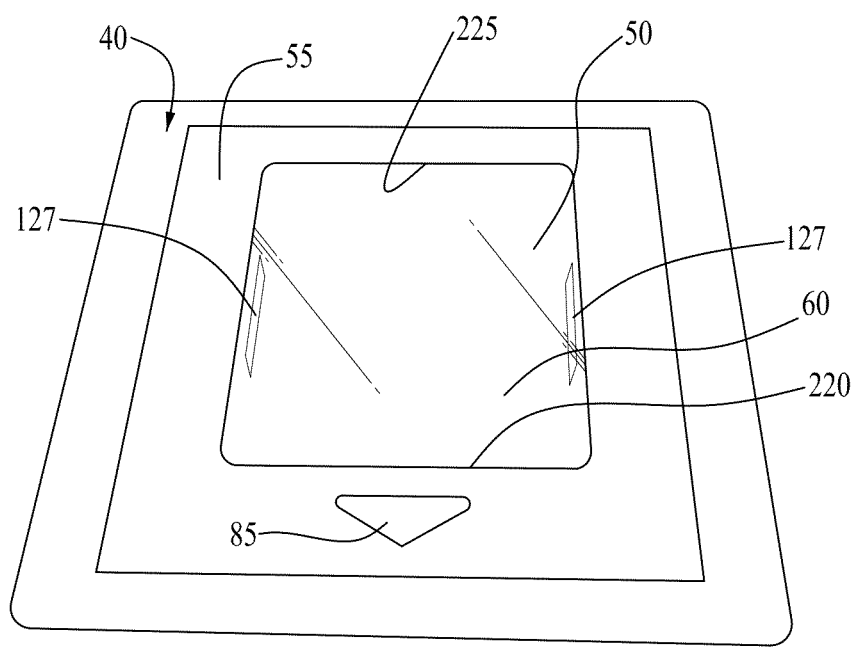

As illustrated in FIGS. 1, 2, and 4, light generators 132 and hollow reflectors 230 are preferably located adjacent to and under bezel 55. Locating light generators 132 and hollow reflectors 230 adjacent to and under bezel 55 helps hide light generators 132 and hollow reflectors 230 from a user's direct view as illustrated in FIGS. 1, 2, and 4. For example, a user standing on, and viewing data read from, the second sidewall 80 of data reader 30 as illustrated in FIG. 2 sees only one of the two light generator 132/hollow reflector 230 combinations because a direct view of the other light generator 132/hollow reflector 230 combination is blocked by bezel 55. A similar view is provided for a user standing on the first sidewall 75 of data reader 30. Likewise, bezel 55 diminishes a user's ability to directly view the two light generator 132/hollow reflector 230 combinations when viewing data reader 30 from the rear wall 70 or from the front wall 65 as illustrated in FIGS. 1 and 4, respectively, especially if the user is not aligned with a central axis 235 of data reader 30.

An arrangement for light sources 121 and light sources 127 is illustrated in FIG. 13. Mounting structure 240 supports substrate 135 and a second substrate 245. Mounting structure 240 is attached to bottom surface 60 of data reader 30 via pins 250. Second reflecting surface 115 facilitates projecting the projected read volume 95 to a desired location. Light generators 130 include LEDs which are bottom mounted on substrate 135, which is a printed circuit board (PCB). Two LEDs are located in each of hollow reflectors 140. Light generators 132 include LEDs which are bottom mounted on second substrate 245, which is also a PCB. Using a bottom mounted LED arrangement allows a single PCB for the two side light sources 127 in one embodiment. Preferably, bottom mounting LEDs on a PCB uses a relatively small space and component requirement and reduces the number of connectors needed. One LED is located in each of hollow reflectors 230 (one set of hollow reflectors 230 is not illustrated to clearly show the mounting arrangement of light generators 132).

Figure 17:
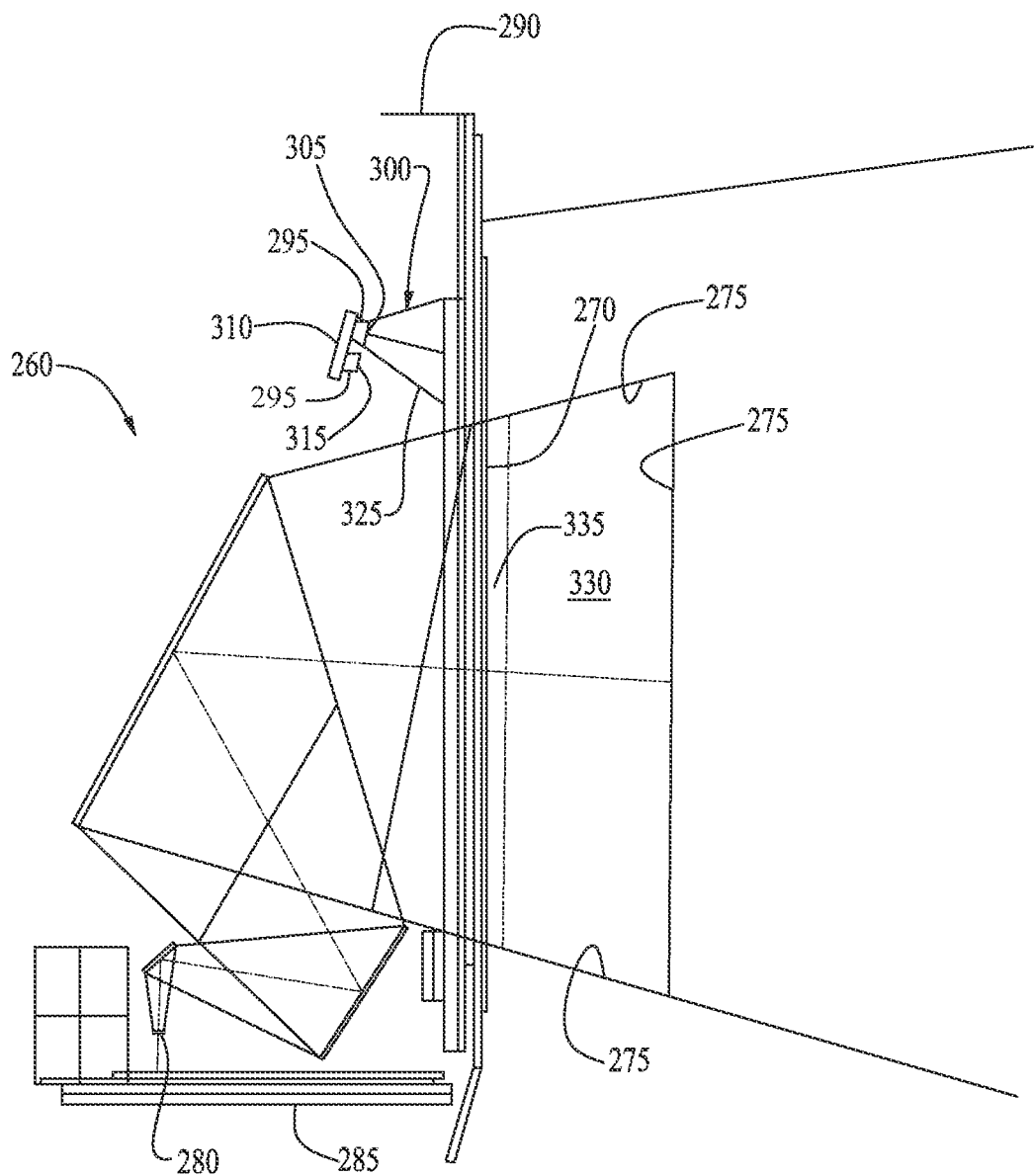
FIG. 17 illustrates a cross sectional view of another embodiment of a presentation-style data reader including a read volume.

FIGS. 14-18 illustrate another embodiment of a data reader. Data reader 260 is configured as a pass-through data reader, that is, a data reader configured to rest, sit, or mount on a relatively flat surface to read data from objects that are passed by the data reader 260 (FIG. 17). The data reader 260 is also suitable as a presentation scanner operable to read data from objects presented in the read volume 275. The light source should provide sufficient illumination in both the far field portion 330 and the near field portion 335 of projected read volume 275. Typical data readers using a single light source commonly saturate (that is, over-illuminate) the near field portion, such as near field portion 335, when the far field portion, such as far field portion 330, is optimized. Additionally, the present inventors have recognized it is preferable to place the illumination source off-axis when a large window scan area is present to avoid producing window reflections on the imager. However, the present inventors have recognized that for current data readers with a large window scan area, such off-axis placement of the illumination source makes it difficult to achieve uniform illumination in a near field portion of the read volume, thus two illumination sources (above and below the window) are commonly used.

Data reader 260 includes a housing (not fully illustrated for clarity) bearing a window 270. Objects with data, indicia, or other suitable information to be read are preferably moved across, or presented in front of, window 270 to enter projected read volume 275.

An imager 280 is located in the housing. The imager 280 is preferably a solid-state imager, such as a charge-coupled device (CCD) imager, complimentary metal-oxide-semiconductor (CMOS) imager, or may be any other suitable imager. The imager 280 is preferably located proximate the bottom 285 of the housing and is centrally located, that is, approximately equidistant from both of the sidewalls (not illustrated) of the housing. In other embodiments, imager 280 may be located proximate the top 290 of the housing, or imager 280 may be closer to either of the sidewalls of the housing. The imager 280 is operative to include a projected three-dimensional read volume 275 (a cross-section of which is illustrated in FIG. 17).

The data reader 260 operates in a similar manner as data reader 30, but includes light generators 295 and hollow reflectors 300 that are arranged differently. Hollow reflectors 300 are similar to hollow reflectors 140 discussed above. Namely, hollow reflectors are preferably rectangular, truncated pyramid-shaped and symmetric. However, other geometric shapes, asymmetric designs, or both may be used. Light generators 295 are arranged in a first row 305 on a substrate 310. One or more light generators 295 of the first row 305 are located in each hollow reflector 300. A second row 315 of light generators 295 is also provided on substrate 310. The light generators 295 in the second row 315 are located outside the hollow reflectors 300. The hollow reflectors 300 have one or more internal reflective surfaces 320 (FIG. 18), which are preferably substantially flat. The hollow reflectors 300 also include at least an external reflective surface 325 that faces the light generators 295 in the second row 315. External reflective surface 325 may be configured as described above with respect to the reflective surfaces of hollow reflectors 140. The light generators 295 and hollow reflectors 300 are preferably placed behind window 270 in a location that avoids detrimental window reflections from impinging imager 280.

Figure 22:
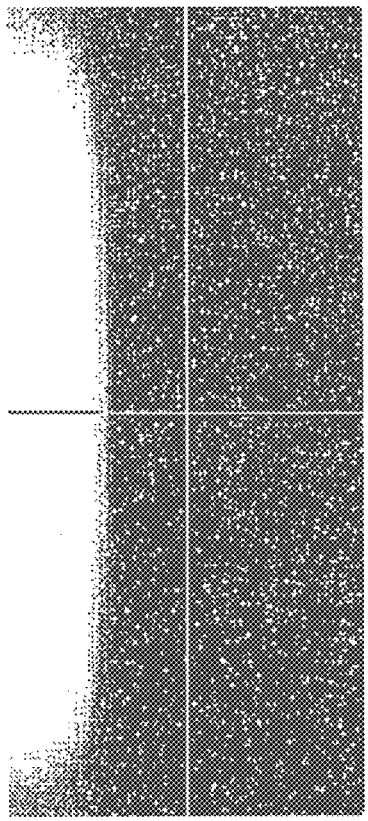
FIG. 22 illustrates a hypothetical light distribution in a far field of the read volume of FIG. 18 with light generators inside hollow reflectors on and light generators outside hollow reflectors off.
Figure 21:
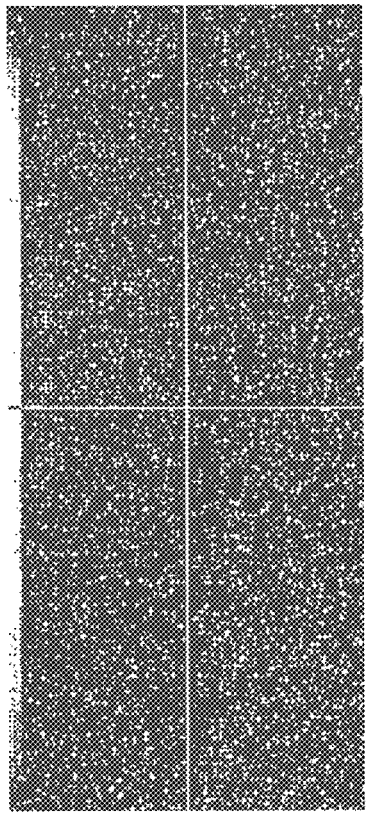
FIG. 21 illustrates a hypothetical light distribution in a near field of the read volume of FIG. 18 with light generators inside hollow reflectors on and light generators outside hollow reflectors off.

The mounting orientation and position for hollow reflectors 300 on substrate 310, the configuration of internal reflective surfaces 320 of hollow reflectors 300, and the location of light generators 295 in hollow reflectors 300 cooperate to reflect, redirect, or project light from light generators 295 of the first row 305 into a far field portion 330 of projected read volume 275. FIG. 21 illustrates a hypothetical light availability graph for a near field portion 335 of projected read volume 275, for example, at 0 millimeters (mm) from window 270, when only the light generators 295 in the first row 305 emit light. FIG. 22 illustrates a hypothetical light availability graph for the far field portion 330 of projected read volume 275, for example, at 25 mm from window 270, when only the light generators 295 in the first row 305 emit light. As illustrated in FIGS. 21 and 22, the far field portion 330 of the projected read volume 275 is adequately illuminated and the near field portion 335 of the projected read volume 275 is under-illuminated when only the light generators 295 in the first row 305 emit light.

Figure 20:
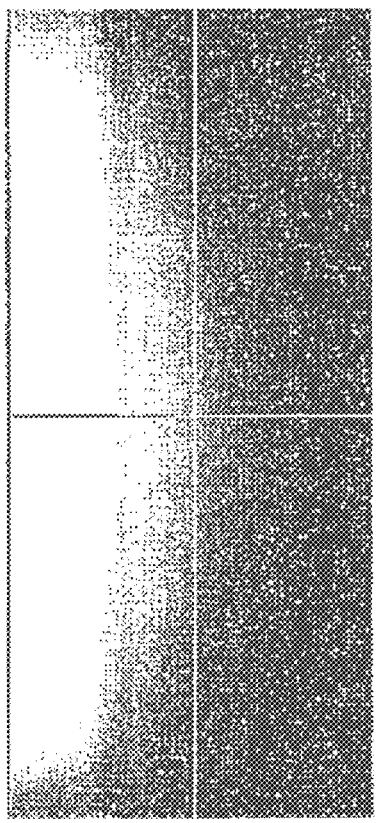
Figure 19:
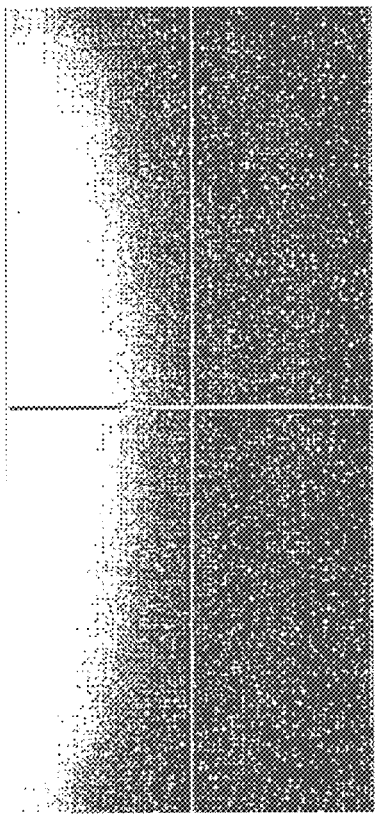

When light generators 295 in the second row 315 emit light, a majority of such light reflects off external reflective surfaces 325 and into the near field portion 335 of the projected read volume 275. FIG. 19 illustrates a hypothetical light availability graph for a near field portion 335 of projected read volume 275, for example, at 0 mm from window 270, when both the light generators 295 in the first row 305 and second row 315 emit light. FIG. 20 illustrates a hypothetical light availability graph for the far field portion 330 of projected read volume 275, for example, at 25 mm from window 270, when both the light generators 295 in the first row 305 and the second row 315 emit light. As illustrated in FIGS. 19 and 20, both the far field portion 330 and the near field portion 335 of the projected read volume 275 are adequately illuminated when both the light generators 295 in the first row 305 and the second row 315 emit light. It is preferable to mount light generators 295 and hollow reflectors 300 in data reader 260 such that light generators 295 are not directly viewable by a user unless data reader 260 is tilted away from the user, for example, in excess of 30°.

It will be obvious to those having skill in the art that many changes may be made to the details of the above-described embodiments without departing from the underlying principles of the invention. While certain preferred systems and methods have been shown and described, it will be apparent to one skilled in the art that modifications, alternatives and variations are possible without departing from the inventive concepts set forth herein. Therefore, the invention is intended to embrace all such modifications, alternatives and variations.

The invention claimed is:

1. A data reader comprising:
a housing including a transparent window;
an optical imager contained in the housing and arranged to have a read volume projecting through the transparent window;
a light source contained in the housing and arranged to project light into at least a portion of the read volume;
wherein the light source includes:
(a) a plurality of light generators mounted on a substrate; and
(b) a series of juxtaposed reflectors mounted on the substrate, wherein at least one light generator is located in each reflector,
wherein each reflector includes walls arranged in a hollow, truncated pyramid shape, wherein each wall includes a substantially flat reflective surface that faces an inner portion of the hollow, truncated pyramid shape,
wherein each reflector includes (a) four walls, (b) a smaller rectangle-shaped opening proximate the at least one light generator, (c) a larger rectangle-shaped opening distal from the at least one light generator, and (d) an axis running through a midpoint of the smaller rectangle-shaped opening and a midpoint of the larger rectangle-shaped opening, and
wherein each axis of each reflector intersects the window at an angle between approximately 65° and 35°.

2. A data reader according to claim 1, further comprising:
(c) a diffuser mounted on the reflectors;
wherein the plurality of light generators, the reflectors, and the diffuser cooperate to provide illumination that appears to a viewer as a substantially uniform bar of light.

3. A data reader according to claim 1, wherein each axis of each reflector intersects the window at an angle of approximately 45°.

4. A data reader according to claim 1, wherein:
the housing includes a top surface bearing the window, a bottom surface opposite the top surface, and a front wall, a rear wall, a first sidewall, and a second sidewall extending between the top surface and the bottom surface, wherein the housing and the optical imager are arranged to image objects moved over the window in a direction from the front wall toward the rear wall; and
the light source is located proximate the rear wall.

5. A data reader comprising:
a housing including a transparent window;
an optical imager contained in the housing and arranged to have a read volume projecting through the transparent window;
a first light source contained in the housing and arranged to project light into at least a portion of the read volume, wherein the first light source includes (a) a first plurality of light generators mounted on a first substrate, and (b) a first series of juxtaposed reflectors mounted on the first substrate, wherein at least one light generator is located in each first reflector, wherein each first reflector includes walls arranged in a hollow, truncated pyramid shape, wherein each wall includes a substantially flat reflective surface that faces an inner portion of the hollow, truncated pyramid shape, wherein the housing includes a top surface bearing the window, a bottom surface opposite the top surface, and a front wall, a rear wall, a first sidewall, and a second sidewall extending between the top surface and the bottom surface, wherein the housing and the optical imager are arranged to image objects moved over the window in a direction from the front wall toward the rear wall, wherein the first light source is located proximate the rear wall;
a second light source contained in the housing proximate the first sidewall and arranged to project light into at least a portion of the read volume;
a third light source contained in the housing proximate the second sidewall and arranged to project light into at least a portion of the read volume;
wherein the second light source includes;
(a) a second plurality of light generators mounted on a second substrate; and
(b) a second series of juxtaposed hollow reflectors mounted on the second substrate, wherein at least one of the second plurality of light generators is located in each of the second hollow reflectors; and
wherein the third light source includes;
(c) a third plurality of light generators mounted on the second substrate;
(d) a third series of juxtaposed hollow reflectors mounted on the second substrate,
wherein at least one of the third plurality of light generators is located in each of the third hollow reflectors.

6. A data reader according to claim 5, wherein the second and third light sources are located closer to the front wall than to the rear wall.

7. A data reader according to claim 5, further comprising:
a first diffuser mounted on the first reflectors;
a second diffuser mounted on the second hollow reflectors; and
a third diffuser mounted on the third hollow reflectors;
wherein each reflector of the second and third light sources includes walls arranged in a hollow, truncated pyramid shape; and wherein the plurality of light generators, the reflectors, and the diffuser of the second light source cooperate to provide illumination that appears to a viewer as a substantially uniform bar of light; and wherein the plurality of light generators, the reflectors, and the diffuser of the third light source cooperate to provide illumination that appears to a viewer as a substantially uniform bar of light.

8. A data reader according to claim 7, wherein:
the truncated pyramid shape of the reflectors of the light source are substantially symmetric;
the truncated pyramid shape of the reflectors of the second and third light sources are asymmetric; and
the asymmetric truncated pyramid shape of the reflectors of the second and third light sources are configured to project light toward the window proximate the front wall.

9. A data reader according to claim 5, further comprising an opaque frame surrounding the window;
wherein the second and third light sources are substantially located underneath portions of the opaque frame to at least partially obscure a direct view of the second or third light source when a user looks into the window.

10. A data reader according to claim 5, wherein:
the first plurality of light generators, the second plurality of light generators, and the third plurality of light generators include light emitting diodes (LEDs);
the first substrate includes a printed circuit board (PCB);
the second substrate includes a PCB; and
the second and third plurality of LEDs are bottom mounted to the PCB of the second substrate.

11. A data reader comprising:
a housing including a transparent window;
an optical imager contained in the housing and arranged to have a read volume projecting through the transparent window;
a light source contained in the housing and arranged to project light into at least a portion of the read volume;
wherein the light source includes;
(a) a first plurality of light generators mounted on a substrate; and
(b) a series of juxtaposed reflectors mounted on the substrate, wherein at least one light generator is located in each reflector;
wherein each reflector includes walls arranged in a hollow, truncated pyramid shape, wherein each wall includes a substantially flat reflective surface that faces an inner portion of the hollow, truncated pyramid shape, wherein:
the read volume includes a near field and a far field;
the light source includes a second plurality of light generators;
each light generator of the second plurality of light generators is located outside the hollow, truncated pyramid shape of each reflector;
at least one wall of each reflector includes an outer reflective surface proximate a light generator of the second plurality of light generators;
the light generators located inside the hollow, truncated pyramid shape of each reflector and the reflective surface that faces the inner portion of the truncated pyramid shape of each reflector are configured to project light into the far field of the read volume; and
the light generators located outside the hollow, truncated pyramid shape of each reflector and the outer reflective surface are configured to project light into the near field of the read volume.

12. A data reader comprising:
a housing including a transparent window, wherein the window includes a substantially flat surface;
an imager contained in the housing and arranged to have a read volume projecting through the transparent window;
a light source contained in the housing and arranged to project light into at least a portion of the read volume, wherein the light source includes an illumination axis;
wherein the illumination axis forms an angle with respect to the substantially flat surface of the window between approximately 65° and 35°.

13. A data reader according to claim 12, wherein the light source includes;
(a) a plurality of light emitting diodes (LEDs) mounted on a substrate; and
(b) a series of juxtaposed reflectors mounted on the substrate, wherein at least one LED is located in each reflector.

14. A data reader according to claim 13, wherein the light source further includes a diffuser mounted on the reflectors.

15. A data reader according to claim 14, wherein each reflector includes four walls arranged in a hollow, truncated rectangle pyramid shape, wherein each wall includes a substantially flat reflective surface that faces an inner portion of the truncated rectangle pyramid shape; and
wherein the plurality of LEDs, the reflectors, and the diffuser cooperate to provide illumination that appears to a viewer as a substantially uniform bar of light.

16. A data reader according to claim 12, wherein the housing includes a top surface bearing the window, a bottom surface opposite the top surface, and a front wall, a rear wall, a first sidewall, and a second sidewall extending between the top surface and the bottom surface, wherein the housing and the optical imager are arranged to image objects moved over the window in a direction from the front wall toward the rear wall; and
the light source is located proximate the rear wall.

17. A data reader comprising:
a housing including a transparent window, wherein the window includes a substantially flat surface;
an imager contained in the housing and arranged to have a read volume projecting through the transparent window;
a first light source contained in the housing and arranged to project light into at least a portion of the read volume, wherein the first light source includes an illumination axis, wherein the illumination axis forms an angle with respect to the substantially flat surface of the window between approximately 80° and approximately 25°, wherein the housing includes a top surface bearing the window, a bottom surface opposite the top surface, and a front wall, a rear wall, a first sidewall, and a second sidewall extending between the top surface and the bottom surface, wherein the housing and the optical imager are arranged to image objects moved over the window in a direction from the front wall toward the rear wall, and wherein the first light source is located proximate the rear wall;
a second light source contained in the housing proximate the first sidewall and arranged to project light into at least a portion of the read volume, wherein the second light source includes an illumination axis;
a third light source contained in the housing proximate the second sidewall and arranged to project light into at least a portion of the read volume, wherein the third light source includes an illumination axis;

wherein each of the second and third illumination axes forms an angle with respect to the substantially flat surface of the window between approximately 80° and approximately 25°.

18. A data reader according to claim 17, further comprising an opaque frame surrounding the transparent window;
wherein the first light source, second light source, and third light source are each substantially located underneath a portion of the opaque frame to at least partially obscure a direct view of one or more of the light source, second light source, and third light source when a user or customer looks into the window.

19. A data reader according to claim 17, wherein each of the second and third light sources includes
(a) a plurality of light emitting diodes (LEDs) mounted on a substrate;
(b) a series of juxtaposed reflectors mounted on the substrate, wherein at least one LED is located in each reflector; and
(c) a diffuser mounted on the reflectors, and
wherein the first light source includes
(d) a plurality of light emitting diodes (LEDs) mounted on a substrate;
(e) a series of juxtaposed reflectors mounted on the substrate, wherein at least one LED is located in each reflector; and
(f) a diffuser mounted on the reflectors.

20. A data reader according to claim 19, wherein:
each reflector of the first light source includes four walls arranged in a hollow, truncated rectangle pyramid shape, wherein each wall includes a substantially flat reflective surface that faces an inner portion of the hollow, truncated rectangle pyramid shape;
the plurality of LEDs, the reflectors, and the diffuser of the first light source cooperate to provide illumination that appears to a viewer as a substantially uniform bar of light;
each reflector of the second and third light sources includes four walls arranged in a hollow, truncated rectangle pyramid shape, wherein each wall includes a substantially flat reflective surface that faces an inner portion of the hollow, truncated rectangle pyramid shape;
the plurality of LEDs, the reflectors, and the diffuser of the second light source cooperate to provide illumination that appears to a viewer as a substantially uniform bar of light; and
the plurality of LEDs, the reflectors, and the diffuser of the third light source cooperate to provide illumination that appears to a viewer as a substantially uniform bar of light.

21. A data reader comprising:
a housing including a transparent window;
an imager contained in the housing and arranged to have a read volume projecting through the transparent window, wherein the read volume includes a near field and a far field;
a light source contained in the housing and arranged to project light into at least a portion of the read volume;
wherein the light source includes;
(a) a first plurality of light generators mounted on a substrate;
(b) a series of juxtaposed hollow reflectors mounted on the substrate, wherein at least one light generator from the first plurality of light generators is located in each hollow reflector; and
(c) a second plurality of light generators, wherein each light generator of the second plurality of light generators is located outside the hollow reflectors, and at least one outside portion of each hollow reflector includes an outer reflective surface proximate a light generator of the second plurality of light generators;
wherein the light generators of the first plurality of light generators located in the hollow reflectors and a reflective surface of each hollow reflector that faces the light generators of the first plurality of light generators are configured to project light toward the far field of the read volume; and
the light generators located outside the hollow reflectors and the outer reflective surfaces of each hollow reflector are configured to project light toward the near field of the read volume.

22. A data reader according to claim 21, further comprising a diffuser mounted on the reflectors.

23. A data reader according to claim 22, wherein each reflector includes walls arranged in a hollow, truncated pyramid shape; and
wherein the first plurality of light generators, the reflectors, and the diffuser cooperate to provide illumination that appears to a viewer as a substantially uniform bar of light.

24. A data reader according to claim 23, wherein each reflector includes (a) four walls, (b) a smaller rectangle-shaped opening proximate the light generator, and (c) a larger rectangle-shaped opening distal from the light generator.

* * * * *

UNITED STATES PATENT AND TRADEMARK OFFICE
CERTIFICATE OF CORRECTION

PATENT NO. : 9,135,484 B2
APPLICATION NO. : 13/232760
DATED : September 15, 2015
INVENTOR(S) : Shearin et al.

Page 1 of 1

It is certified that error appears in the above-identified patent and that said Letters Patent is hereby corrected as shown below:

In the specification

Column 3
Line 54, after "illustrated" insert --in--.

Column 7
Line 28, change "bound" to --boundary--.

Column 8
Line 57, change "provide" to --provides--.

Column 12
Line 43, change "includes;" to --includes:--.
Line 50, change "includes;" to --includes:--.

Column 13
Line 40, change "includes;" to --includes:--.

Column 14
Line 13, change "includes;" to --includes:--.

Column 16
Line 13, change "includes;" to --includes:--.

Signed and Sealed this
Eighth Day of March, 2016

Michelle K. Lee
*Director of the United States Patent and Trademark Office*